(No Model.) 7 Sheets—Sheet 1.

G. W. ROBERTSON.
STATION INDICATOR.

No. 462,588. Patented Nov. 3, 1891.

Attest
S. H. Knight
S. Cotter

Inventor
George Washington Robertson
By Knight Bros
Attys.

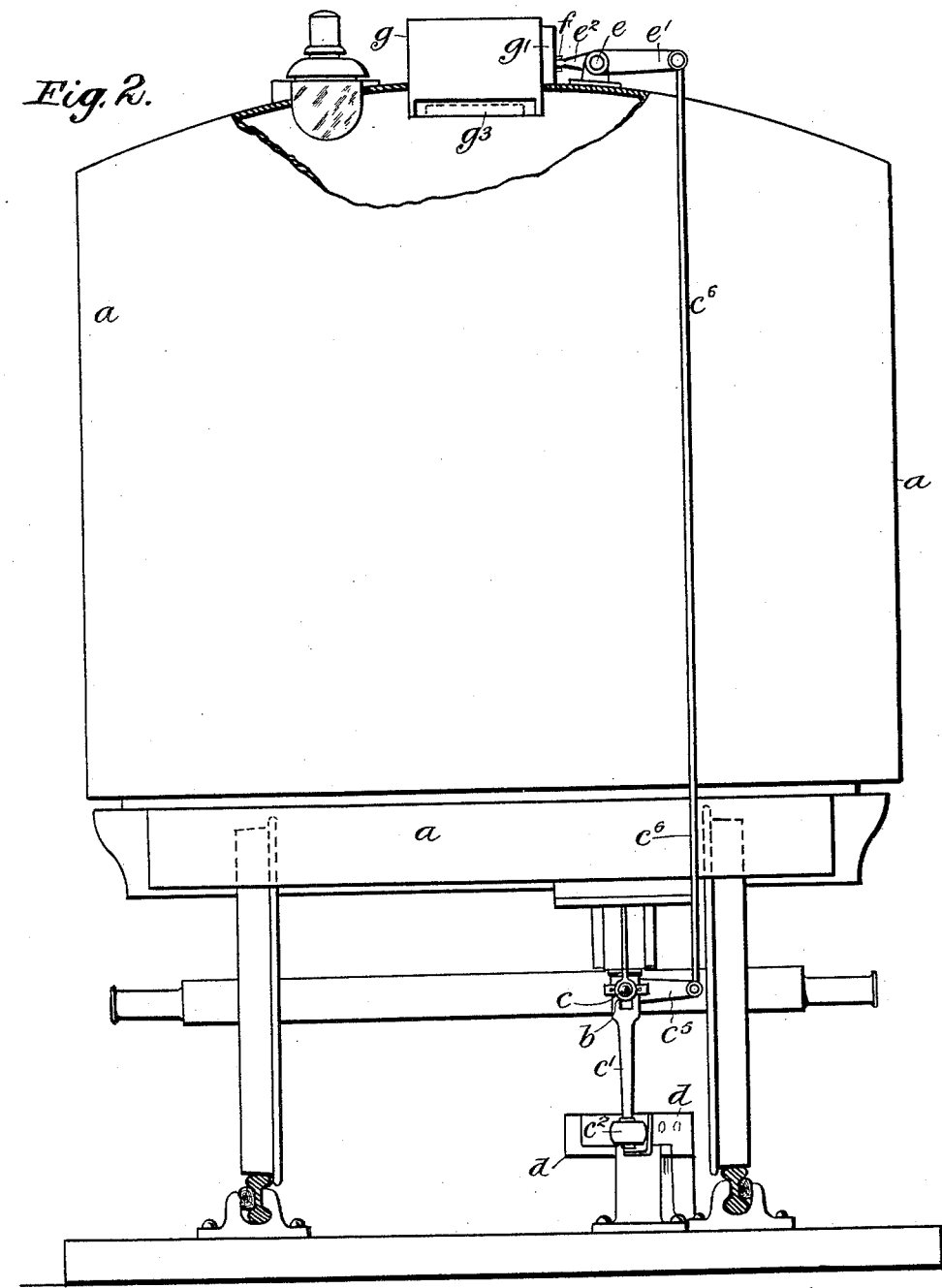

(No Model.)  7 Sheets—Sheet 3.
G. W. ROBERTSON.
STATION INDICATOR.

No. 462,588. Patented Nov. 3, 1891.

Attest
J. H. Knight
S. Cotton

Inventor
George Washington Robertson
By Knight Bros Attys (No Model.)  7 Sheets—Sheet 4.

G. W. ROBERTSON.
STATION INDICATOR.

No. 462,588.  Patented Nov. 3, 1891.

Attest
S. H. Knight
S. Cotton

Inventor
George Washington Robertson
By Knight Bros
Attys.

(No Model.)

7 Sheets—Sheet 5.

G. W. ROBERTSON.
STATION INDICATOR.

No. 462,588.  Patented Nov. 3, 1891.

Attest
S. H. Knight
S. Cotton

Inventor
George Washington Robertson
By Knight Bros.
Atty.

(No Model.) 7 Sheets—Sheet 6.
G. W. ROBERTSON.
STATION INDICATOR.
No. 462,588. Patented Nov. 3, 1891.
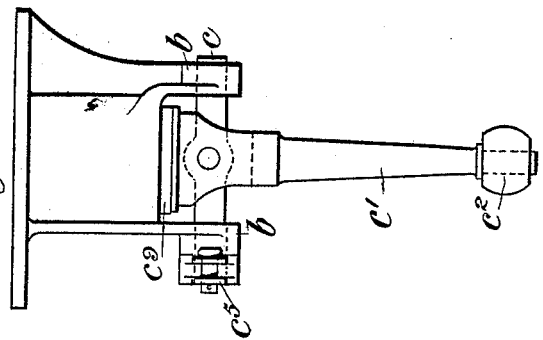
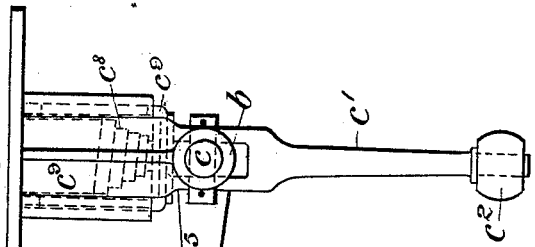
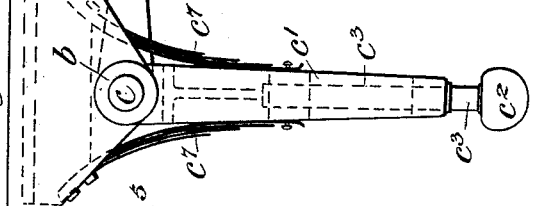
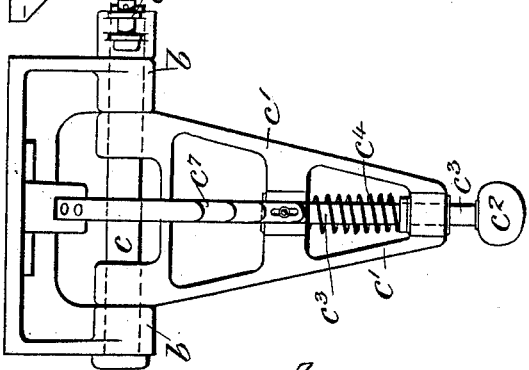
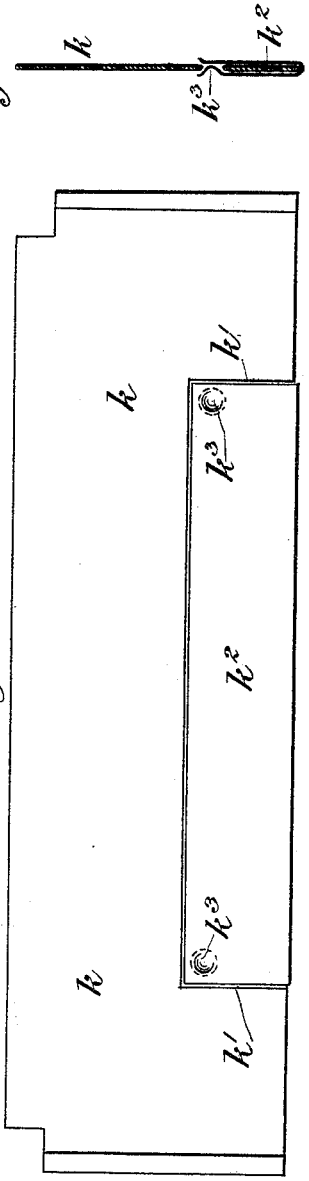
Attest:
S. H. Knight
S. Cotton
Inventor
George Washington Robertson
By Knight Bros
Attys (No Model.)  G. W. ROBERTSON.  7 Sheets—Sheet 7.
STATION INDICATOR.
No. 462,588.  Patented Nov. 3, 1891.
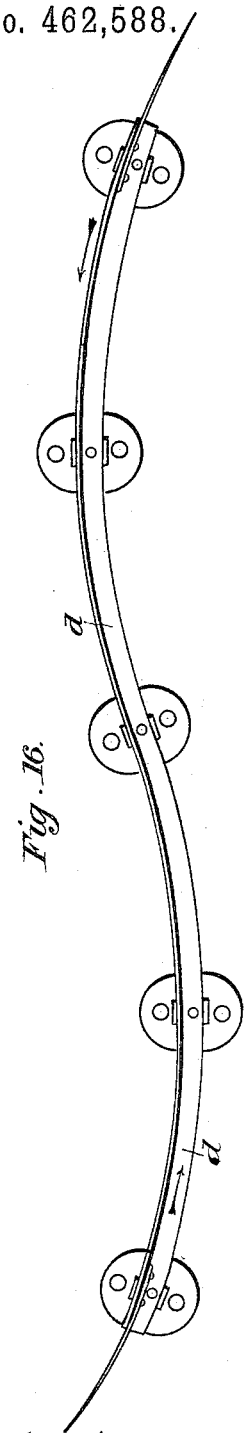
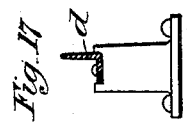
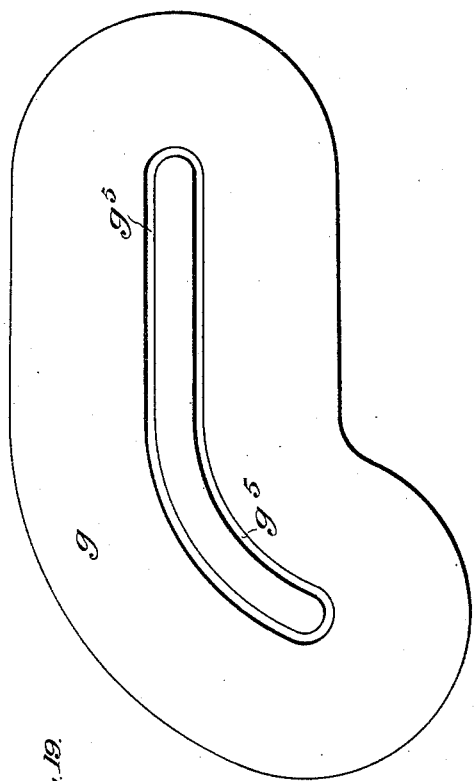
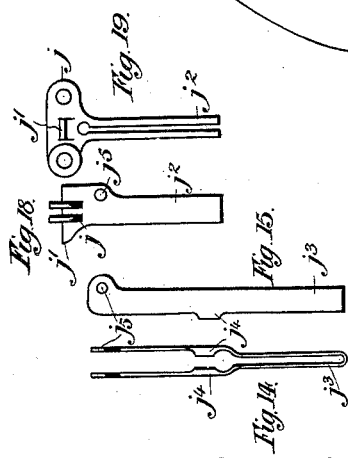
Attest
J. H. Knight
S. Cotton
Inventor
George Washington Robertson
By Knight Bros
Attys
THE NORRIS PETERS CO., PHOTO-LITHO., WASHINGTON, D. C.

UNITED STATES PATENT OFFICE.

GEORGE WASHINGTON ROBERTSON, OF LONDON, ENGLAND.

STATION-INDICATOR.

SPECIFICATION forming part of Letters Patent No. 462,588, dated November 3, 1891.

Application filed November 1, 1890. Serial No. 370,026. (No model.)

*To all whom it may concern:*

Be it known that I, GEORGE WASHINGTON ROBERTSON, a subject of the Queen of Great Britain, residing at 90 Queen Street, Cheapside, London, England, have invented certain new and useful Improvements in Means for Announcing the Names of Stations and for Advertising in Railway-Carriages, of which the following is a specification.

The invention has for its object improvements in means for automatically announcing the names of stations and for advertising in railway-carriages.

The invention is illustrated in the accompanying drawings, in which—

Figure 1:
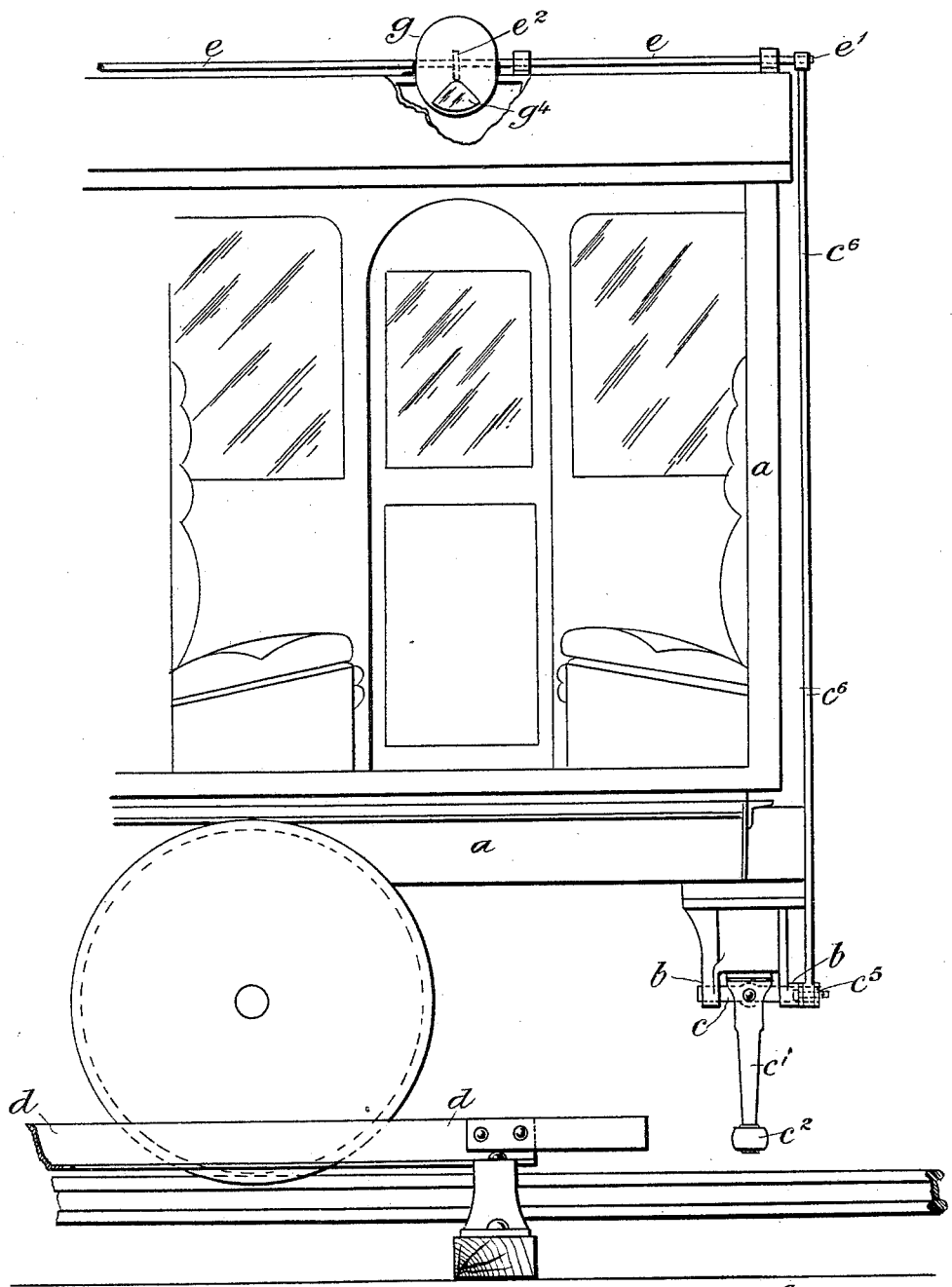
Figure 4:
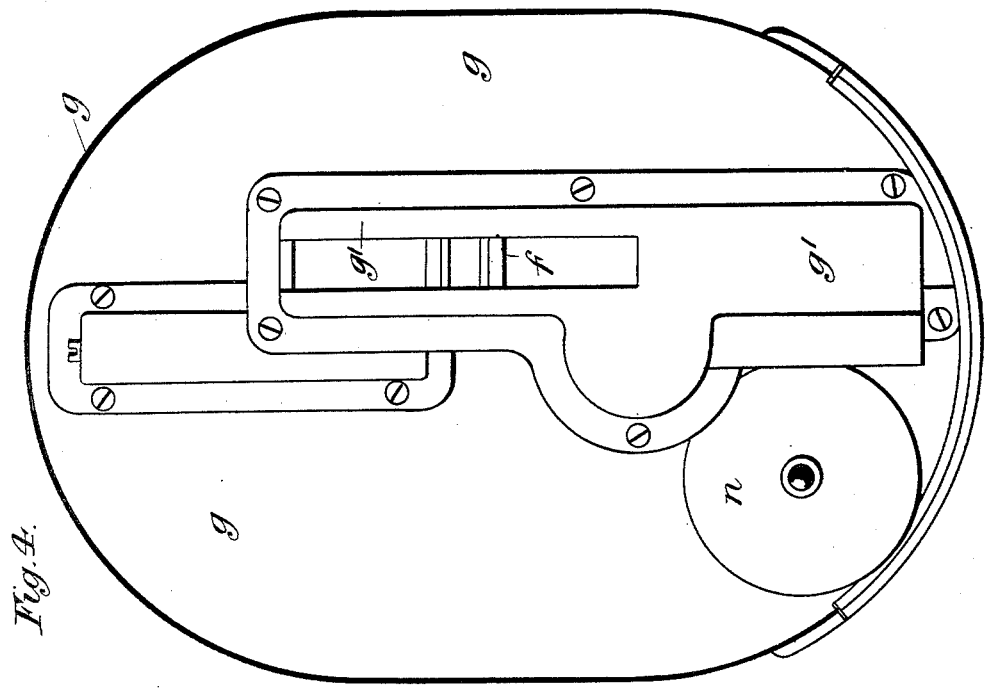
Figure 3:
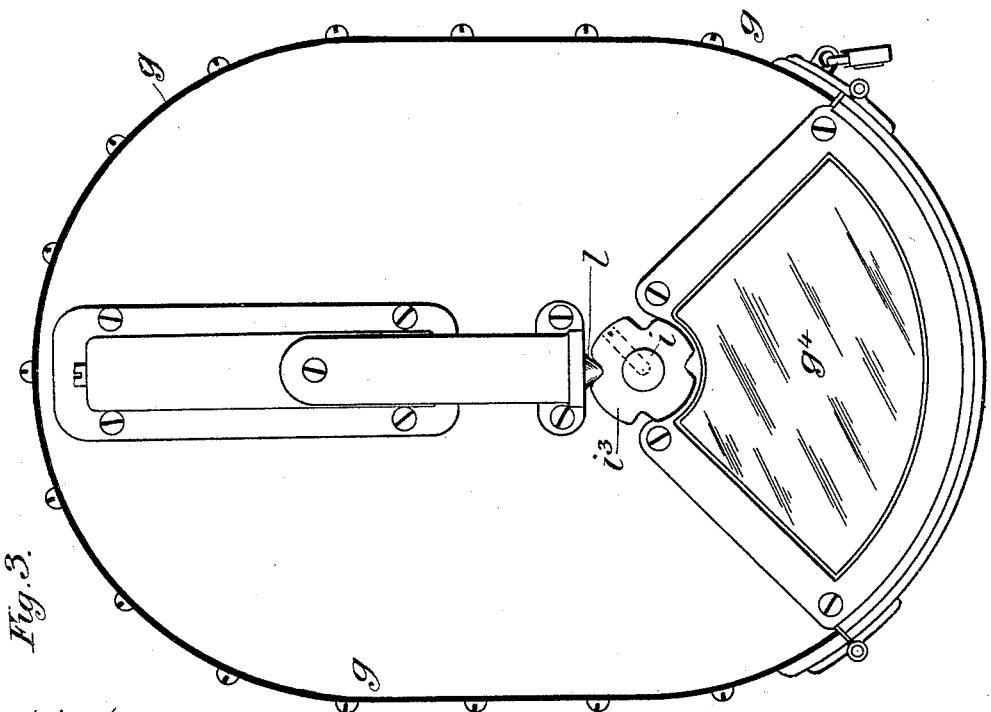
Figure 7:
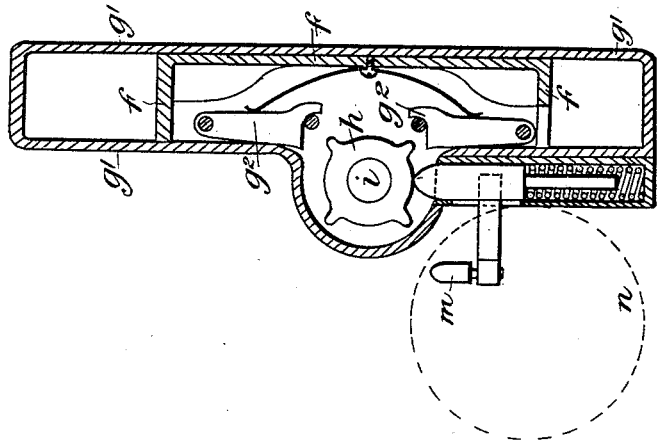
Figure 5:
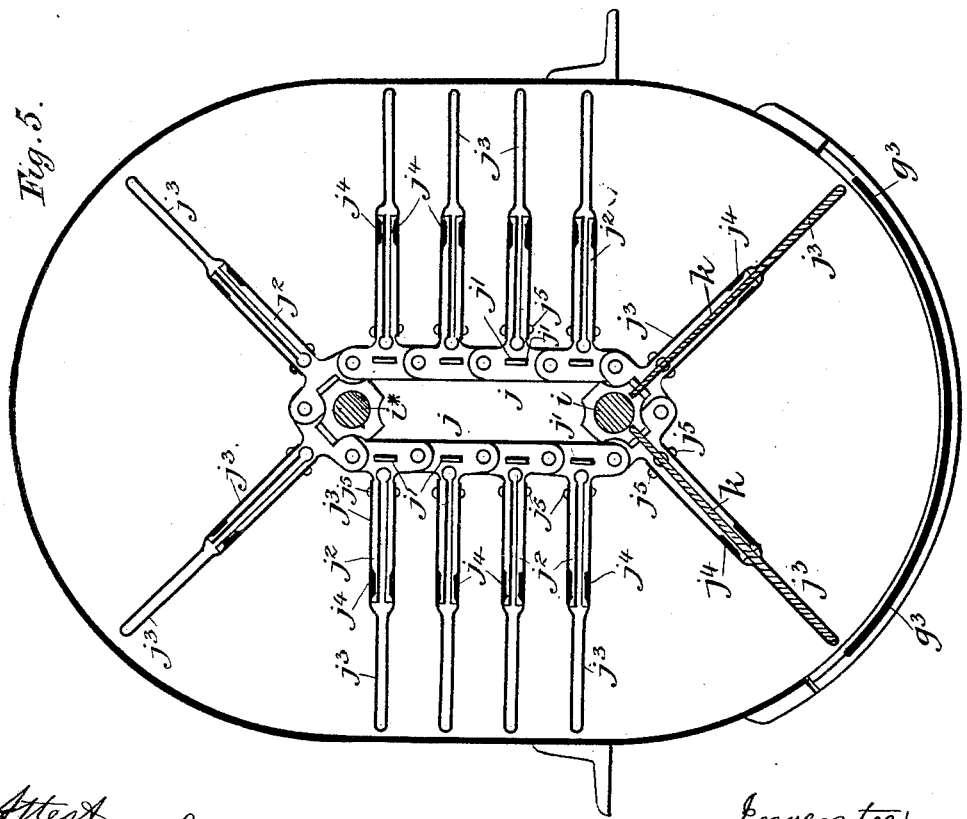
Figure 6:
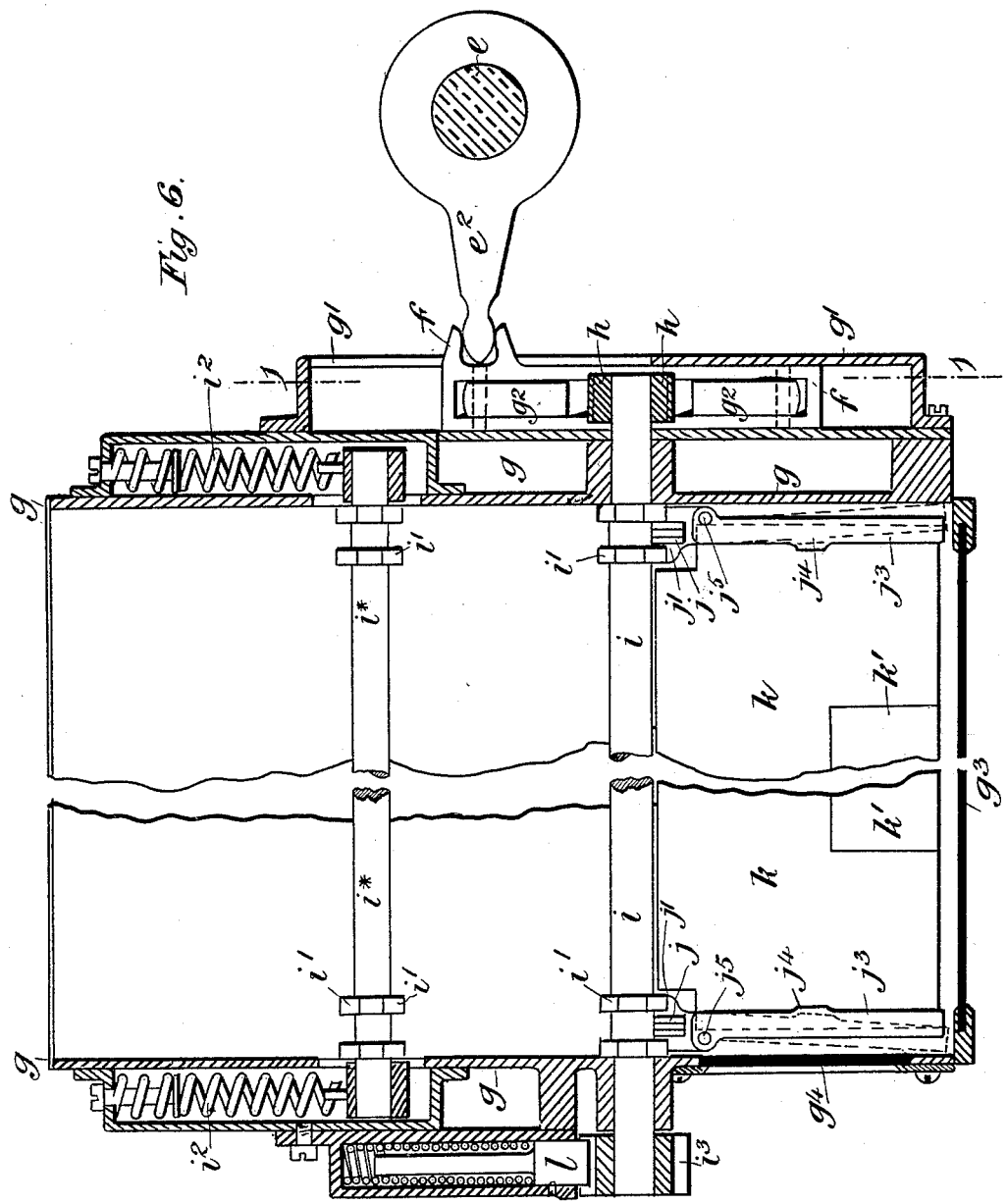

Figure 1 is a longitudinal section of one compartment of a railway-carriage, and Fig. 2 is an end view of parts of the carriage showing my invention applied thereto. Figs. 3 and 4 are opposite end views. Fig. 5 is a vertical cross-section, and Fig. 6 is a vertical longitudinal section, of the indicator containing the advertising-tablets. Fig. 7 is a section drawn on the line 1 1 of Fig. 6. Figs. 8 and 9 are respectively a side elevation and a front elevation of one form of the operating-lever. Figs. 10 and 11 are respectively a front elevation and a side elevation of a modified form of operating-lever. Figs. 12 and 13 are respectively a side view and a cross-section of one of the advertising-tablets. Figs. 14 and 15 are respectively a side view and an edge view of a spring-clip for securing the tablets in position. Figs. 16 and 17 are respectively a plan and a cross-section of the operating-cam fixed on the permanent way. Figs. 18 and 19 are side and front views of one of the chain-links and its connected grooved arm, and Fig. 20 is a diagram showing how an indicator having a larger number of tablets than in the arrangement shown in the previous figures can be arranged.

In all the figures like parts are indicated by similar letters of reference.

For the purpose of my invention I mount in bearings $b$ underneath the body $a$ of the carriage a shaft $c$, which is fitted with a lever $c'$, normally held in a central position, but which can be moved to the one side or the other by fixed cams $d$ on the permanent way. The lever $c'$, according to the arrangement shown at Figs. 8 and 9, is fitted with a ball or knob $c^2$ at the lower end of the rod $c^3$, which is pressed downward by a spring $c^4$, but which, in the event of the ball or knob $c^2$ coming into contact with the ground or permanent way, will be forced upward within its bearings, so as to pass over the same, after which it will be returned to its normal position by the spring $c^4$. The lever $c'$ is held in its normal or central position by means of a spring $c^7$ on each side thereof; but according to the arrangement represented at Figs. 10 and 11 a single central spring $c^8$ is employed, which is inclosed within and presses downward a sliding box $c^9$, the lower flat end of which presses strongly on the upper flat end of the lever $c'$ and tends to keep the latter in its normal position, at the same time permitting motion thereof in any direction. The shaft $c$ has also fixed thereon a lever $c^5$, which is connected by a rod or link $c^6$ with a lever $e'$, fixed on the end of a shaft $e$, passing along the top of the carriage and mounted in bearings fixed thereon. On this upper shaft $e$ are fixed as many levers $e^2$ as there are indicators in the carriage, one of which may be placed in each compartment thereof. These levers $e^2$ each act in combination with a slide $f$, suitably guided in a frame $g'$, attached to the indicator-frame $g$ and carrying two pawls $g^2$, arranged to drive a toothed wheel $h$ in either direction, according to the direction of partial rotation given to the driving-shafts $c\ c$ by the fixed cams or inclines $d$. The toothed wheel $h$ is fixed on one end of one of a pair of parallel shafts $i\ i^*$, mounted within the indicator $g$, and such shafts are formed or provided near their ends with notched wheels $i'$, to act as chain-wheels, around which chains $j$ are passed. The shaft $i^*$ is preferably acted upon by springs $i^2$ to keep the chains taut. Each link of these chains $j$ is formed with a flat projection $j'$, to act in conjunction with the flats on the wheels $i'$, and it is also formed with a projecting grooved arm $j^2$. Into the grooves of each pair of opposite arms $j^2$ a card or tablet $k$ is placed, which may have on each side the name of a station and any desired advertisement. A spring-clip $j^3$ (shown separately at Figs. 14 and 15) is mounted on a stud or pin $j^5$ carried by each arm, and it is formed with projections $j^4$ to clip over the edge of the grooved arm $j^2$, to enable the cards or tablets $k$ to to be readily inserted and removed as may be required and to secure the same in position. Other means of holding the tablets may, however, be employed.

I prefer to provide the tablets $k$ with a cut-out space $k'$ to receive a spring supplemental tablet $k^2$, made to clip the tablet $k$ between the two sides thereof, and such supplemental tablet $k^2$ is provided with studs or depressions $k^3$ to clip into eyelets formed in the tablet $k$, so as to enable the tablet $k^2$ to be readily applied to and removed from the tablet $k$.

The tablet $k$ has any required advertisement on both sides thereof and the tablet $k^2$ has the names of two consecutive stations, one on one side and the other on the other side thereof. It will be evident that adjacent faces of any two tablets must be furnished with the name of the same station.

To insure correct adjustment of the cards or tablets $k$ at each movement, I fix to the indicator-shaft $i$ a notched wheel $i^3$, and I arrange a spring-dog $l$ to act in connection with such wheel, so that as the latter is rotated the spring-dog, by falling into the notches of the wheel $i^3$, will insure the correct adjustment of such wheel $i^3$ and will retain it in correct position until the next movement is given. The toothed wheel $h$ is also arranged to give motion to a spring-hammer $m$, to cause it to strike a bell $n$ at each movement of the indicator; but, if desired, the wheel $i^3$ might be used for such purpose.

The toothed wheel $h$ is situated midway between the pawls or drivers $g^2$, and free thereof when the latter are at rest. I am thus enabled to turn the shafts $i$ $i^*$ of the indicator freely in either direction by hand for renewal or alteration of the cards or tablets, or for other purposes.

The grooved arms $j^2$, carrying the tablets, are so arranged within the indicator-case $g$ that two of the tablets can simultaneously be seen through the glass front $g^3$, at such an angle to each other as to show the back of one tablet or card and the front of another—that is to say, the two adjacent sides of such tablets—so that the matter contained thereon can be readily seen. That part of the indicator which is within the carriage is also provided with glass $g^4$ at one end and with a reflector at the other end to assist in illuminating the interior thereof.

By causing the lever $c'$ to be moved by the cam $d$ to either side of its normal or central position and by arranging the pawls $g^2$ to act on opposite sides of the toothed wheel $h$ the correct announcement of the name of a station is always secured, as, however many times the carriage may pass a given cam backward and forward the indicator will be similarly operated, as it will be moved either backward or forward according to the direction of motion of the carriage.

Fig. 20 represents one side of an indicator-frame capable of accommodating a larger number of tablets than that shown in the previous figures. In this case the sides of the indicator are formed with grooves $g^5$, within which the ends of elongated studs forming the joints of the chains $j$ travel and thereby guide the chains to travel correctly within the indicator. The indicator in this case has the portion exterior of the carriage formed to lie along the top thereof, as it is too long to be allowed to stand in a vertical position.

Having fully described my invention, what I claim, and desire to secure by Letters Patent, is—

1. A station-annunciator and advertising apparatus for railway-carriages, consisting of a case $g$ entering the roof of the carriage, a glass front $g^3$ and glass end $g^4$ to such case, endless chains $j$, passing around chain-wheels $i'$, fixed on shafts $i$ $i^*$ and carrying grooved arms $j^2$, cards or tablets $k$ fitting such grooved arms, tablet-retaining spring-clips $j^3$, toothed wheel $h$, fixed on the axis $i$, pawls $g^2$ for operating such toothed wheel, a slide $f$ for carrying such pawls, and a lever $e^2$, shaft $e$, lever $e'$, connecting-rod $c^6$, lever $c^5$, shaft $c$, lever $c'$, and fixed cam $d$ for giving motion to the slide $f$, substantially as herein shown and described.

2. In station-annunciators and advertising apparatus for railway-carriages, a case $g$, formed with glass front $g^3$, endless chains $j$, passing around chain-wheels $i$ in such case, advertising and station annunciating tablets $k$ $k^2$, carried by such chains, the toothed wheel $h$ on one of the axes carrying the endless chains $j$, the slide $f$, carrying pawls $g$, adapted to engage said toothed wheel, and apparatus operated by fixed cams $d$ for giving motion to such slide, substantially as herein shown and described.

3. In station annunciating and advertising apparatus for railway-carriages of the character above referred to, advertisement-tablets $k$, carried by endless chains $j$, and supplemental station-indicating tablets $k^2$, removably attached to the tablets $k$, substantially as herein shown and described.

4. In a station annunciating and advertising apparatus, the combination of the fixed actuating-cams $d$ at intervals along the permanent way, the spring-pressed lever $c'$, carrying a spring-pressed rod adapted to engage said cams, the toothed wheels $h$, the chain-wheels $i$, the endless chains $j$, carried by said wheels $i$ and bearing the advertising-tablets, and the slide carrying pawls engaging said toothed wheels $h$, substantially as set forth.

5. In station annunciating and advertising apparatus of the character above referred to, a toothed wheel $h$ on one of the axes carrying the endless chains $j$, and pawls $g^2$, normally placed at equal distances from such wheel $h$ and carried by a slide *f*, capable of being moved in either direction according to the direction of motion of the carriage, substantially as herein shown and described.

6. The combination, with the station annunciating and advertising apparatus, of a bell and its spring-actuated hammer, the toothed wheel *h*, adapted to engage said hammer and arranged on one of the axes of one of the wheels carrying the chains or belts bearing the advertising-tablets, and the slide carrying pawls engaging said toothed wheel and its actuating mechanism, substantially as described.

GEORGE WASHINGTON ROBERTSON.

Witnesses:
 CLAUDE K. MILLS,
23 *Southampton Buildings, London.*
 REGINALD EYRES,
*Clerk to Mr. Robertson, Kent Villa, Hersham Road, Dalton-on-Thames.*